United States Patent
Seimoto et al.

(10) Patent No.: US 9,746,396 B2
(45) Date of Patent: Aug. 29, 2017

(54) TIRE TRANSPORT METHOD, TIRE TRANSPORT AND FASTENING APPARATUS, AND TIRE INSPECTION SYSTEM

(71) Applicant: MITSUBISHI HEAVY INDUSTRIES MACHINERY TECHNOLOGY CORPORATION, Hiroshima-shi, Hiroshima (JP)

(72) Inventors: Yasutaka Seimoto, Hiroshima (JP); Jiro Agawa, Hiroshima (JP); Morihiro Imamura, Hiroshima (JP)

(73) Assignee: MITSUBISHI HEAVY INDUSTRIES MACHINERY TECHNOLOGY CORPORATION, Hiroshima-shi, Hiroshia (JP)

( * ) Notice: Subject to any disclaimer, the term of this patent is extended or adjusted under 35 U.S.C. 154(b) by 129 days.

(21) Appl. No.: 14/761,497

(22) PCT Filed: Jun. 14, 2013

(86) PCT No.: PCT/JP2013/066437
§ 371 (c)(1),
(2) Date: Jul. 16, 2015

(87) PCT Pub. No.: WO2014/199508
PCT Pub. Date: Dec. 18, 2014

(65) Prior Publication Data
US 2015/0362406 A1    Dec. 17, 2015

(51) Int. Cl.
*G01M 17/02* (2006.01)
*B29D 30/00* (2006.01)
(Continued)

(52) U.S. Cl.
CPC ....... *G01M 17/021* (2013.01); *B29D 30/0016* (2013.01); *B65G 15/12* (2013.01);
(Continued)

(58) Field of Classification Search
CPC .... G01M 17/00; G01M 17/02; G01M 17/021; B60C 25/132; B60C 25/0527
(Continued)

(56) References Cited

FOREIGN PATENT DOCUMENTS

| CN | 1244255 A | 2/2000 |
|---|---|---|
| JP | S63-44541 B2 | 9/1988 |

(Continued)

OTHER PUBLICATIONS

Machine translation of JP2011-174839.*
(Continued)

*Primary Examiner* — David M Gray
*Assistant Examiner* — Andrew V Do
(74) *Attorney, Agent, or Firm* — Manabu Kanesaka; Benjamin Hauptman; Kenneth Berner

(57) ABSTRACT

Provided is a tire transport method for a tire inspection system in which a tire transported from the upstream side is fastened by an upper rim and a lower rim, and a measurement is performed, wherein the method includes transport stem in which a transport mechanism having a pair of transport units split in the width direction transports the tire to a fastening position for fastening, and a parting step in which the pair of transport units is parted in the width direction, such that it is possible for the lower rim to pass between the pair of transport units.

8 Claims, 14 Drawing Sheets

(51) Int. Cl.
*B65G 21/14* (2006.01)
*B65G 15/12* (2006.01)

(52) U.S. Cl.
CPC ...... *B65G 21/14* (2013.01); *B29D 2030/0027* (2013.01); *B65G 2201/0273* (2013.01)

(58) Field of Classification Search
USPC .................................. 73/146; 198/617, 620
See application file for complete search history.

(56) References Cited

FOREIGN PATENT DOCUMENTS

| | | |
|---|---|---|
| JP | H02-044227 A | 2/1990 |
| JP | H105-196533 A | 8/1993 |
| JP | H09-126935 A | 5/1997 |
| JP | 2001-511891 A | 8/2001 |
| JP | 2005-331355 A | 12/2005 |
| JP | 2007-271629 A | 10/2007 |
| JP | 2007-271630 A | 10/2007 |
| JP | 4242846 B2 | 3/2009 |
| JP | 4472838 B2 | 6/2010 |
| JP | 2010-256364 A | 11/2010 |
| JP | 2010-266451 A | 11/2010 |
| JP | 2011-169768 A | 9/2011 |
| JP | 2011-174839 A | 9/2011 |
| TW | 201016488 A1 | 5/2010 |
| TW | 201245682 A1 | 11/2012 |

OTHER PUBLICATIONS

Japan Patent Office, "Office Action for Japanese Patent Application No. 2015-522365," dated Jan. 26, 2016.
China Patent Office, "Office Action for Chinese Patent Application No. 201380077283.3," dated Sep. 26, 2016.
PCT/ISA/210, "International Search Report for International Application No. PCT/JP2013/066437," dated Aug. 20, 2013.
PCT/ISA/237, "Written Opinion of the International Searching Authority for International Application No. PCT/JP2013/066437," dated Aug. 20, 2013.
Taiwan Patent Office, "Office Action for TW 102146397," dated Aug. 6, 2015.
Japan Patent Office, "Notice of Allowance for Japanese Patent Application No. 2016-057655," dated May 17, 2016.

\* cited by examiner

TIRE TRANSPORT METHOD, TIRE TRANSPORT AND FASTENING APPARATUS, AND TIRE INSPECTION SYSTEM

RELATED APPLICATIONS

The present application is National Phase of International Application No. PCT/JP2013/066437 filed Jun. 14, 2013, the disclosure of which is hereby incorporated by reference herein in its entirety.

TECHNICAL FIELD

The present invention relates to a tire transport method, a tire transport and fastening device, and a tire inspection system.

BACKGROUND ART

In a tire manufacturing process, various inspections are performed after a vulcanization process. As an inspection system for performing the inspection of a tire to be inspected after the vulcanization process, for example, a tire uniformity machine for measuring the uniformity of a tire, a dynamic balancing machine for measuring the unbalance of a tire, or the like is known.

In the case of the inspection system such as the tire uniformity machine or the dynamic balancing machine, in general, data measurement is performed in a state of rotating a tire to be inspected on which an inspection is performed, with a bead of the tire to be inspected fastened to a pseudo wheel called a rim.

In the inspection system described above, first, the tire to be inspected on which an inspection is performed is loaded onto a measurement unit for performing the data measurement, by a transport mechanism. At this time, the tire to be inspected is often subjected to centering on the upstream side of the transport mechanism.

Here, as the transport mechanism for loading the tire to be inspected, the tire to be inspected is often transported in a horizontally placed state, and for example, there is a transport mechanism provided with a roller conveyor (refer to PTLs 1 to 4), or a transport mechanism provided with a pair of belt conveyors disposed in parallel (refer to PTLs 5 to 7).

In the case of the transport mechanism provided with the belt conveyors, the distance between the belt conveyors is adjusted according to the inner diameter of the tire to be inspected.

Subsequently, the tire to be inspected loaded onto the measurement unit is fastened with the bead portion thereof pinched by pseudo wheels called an upper rim and a lower rim. Thereafter, the data measurement is performed in a state where the tire to be inspected rotates with air supplied to the inside until an appropriate air pressure is obtained.

CITATION LIST

Patent Literature

[PTL 1] Japanese Examined Patent Application Publication No. 63-44541
[PTL 2] Japanese Unexamined Patent Application Publication No. 9-126935
[PTL 3] Japanese Patent No. 4472838
[PTL 4] Japanese Patent No. 4242846
[PTL 5] Japanese Unexamined Patent Application Publication No. 2011-169768
[PTL 6] Japanese Unexamined Patent Application Publication No. 2007-271629
[PTL 7] Japanese Unexamined Patent Application Publication No. 2007-271630

SUMMARY OF INVENTION

Technical Problem

Incidentally, when transporting the tire to be inspected by the belt conveyors, there is a case where the orientation of the tire to be inspected becomes unstable. If the orientation of the tire to be inspected during transport becomes unstable, a shift occurs in the feed rate of the belt conveyor and the transport distance of the tire to be inspected, and thus there is a possibility that the tire to be inspected may be unable to be transported to a correct position. Further, the tire to be inspected cannot be transported to a correct position, whereby there is a possibility that the tire to be inspected may be unable to be properly fastened by the upper rim and the lower rim in the measurement unit. Similarly, also when an inspected tire is placed from the upper rim and the lower rim onto the belt conveyors, there is a case where the orientation of the inspected tire becomes unstable.

Here, the orientation of a tire on the belt conveyors is affected by the curvature of a sidewall, the rigidity of the tire to be inspected, the weight of the tire to be inspected, a frictional force in a contact surface between the tire to be inspected and the belt conveyor, or the like.

In particular, the shorter a contact arc length which is the length in a circumferential direction of the tire to be inspected which comes into contact with the belt conveyor becomes, the higher the probability that the orientation of the tire to be inspected during transport may become unstable.

The contact arc length of the tire to be inspected with respect to the belt conveyor can be increased by narrowing the distance between the pair of belt conveyors. However, the tire to be inspected is pinched by the upper rim and the lower rim on the belt conveyors, and therefore, the lower rim cannot pass between the pair of belt conveyors. That is, in order to perform a pinching operation, it is necessary for the distance between the conveyors to be wider than the diameter of the lower rim.

The present invention provides a tire transport method, a tire transport and fastening device, and a tire inspection system in which it is possible to transport a tire to a correct position and properly fasten the tire.

Solution to Problem

According to a first aspect of the present invention, there is provided a tire transport method in a tire inspection system for performing measurement with a tire transported from an upstream side fastened by an upper rim and a lower rim, the method including: a transport step of transporting the tire to a fastening position for fastening the tire, by a transport mechanism having a pair of transport units divided in a width direction. The tire transport method further includes a spacing-apart step of making the pair of transport units be spaced apart from each other in the width direction such that the lower rim can pass between the pair of transport units.

In a tire transport method according to a second aspect of the present invention, the tire transport method according to the first aspect may further include a holding step of holding the tire disposed on the pair of transport units at the fastening position, wherein the spacing-apart step may be performed in a state where the tire is held in the holding step.

In a tire transport method according to a third aspect of the present invention, in the holding step of the tire transport method according to the second aspect, the tire disposed on the pair of transport units may be held by the upper rim.

According to a fourth aspect of the present invention, there is provided a tire inspection system including: a measuring device for measuring characteristics of the tire transported by the tire transport method according to any one of the first aspect to the third aspect.

According to a fifth aspect of the present invention, there is provided a tire transport and fastening device for transporting a tire to a fastening position set in advance and pinching and fastening the tire by an upper rim and a lower rim at the fastening position. The tire transport and fastening device includes: a pair of transport units divided in a width direction, for transporting the tire; and a slide mechanism for making the pair of transport units approach each other and be spaced apart from each other in the width direction. The tire transport and fastening device further includes a control unit for controlling approach and spacing-apart of the pair of transport units by the slide mechanism. Further, the control unit makes the pair of transport units be spaced apart from each other by the slide mechanism such that the lower rim can pass between the pair of transport units, if the tire is transported to the fastening position by the pair of transport units.

In a tire transport and fastening device according to a sixth aspect of the present invention, the tire transport and fastening device according to the fifth aspect may further include: a holding mechanism for holding the tire transported to the fastening position, thereby restricting movement of the tire, when the pair of transport units are spaced apart from each other by the slide mechanism.

In a tire transport and fastening according to a seventh aspect of the present invention, the holding mechanism in the tire transport and fastening device according to the fifth aspect or the sixth aspect may hold the tire by the upper rim.

According to an eighth aspect of the present invention, there is provided a tire inspection system including: the tire transport and fastening device according to any one of the fifth aspect to the seventh aspect; and a measuring device for measuring characteristics of the tire fastened by the upper rim and the lower rim.

Advantageous Effects of Invention

According to the above aspects, it becomes possible to transport a tire to a correct position and properly fasten the tire.

DESCRIPTION OF EMBODIMENTS

Hereinafter, a tire inspection system provided with a tire transport and fastening device according to a first embodiment of the present invention will be described.

Figure 1:
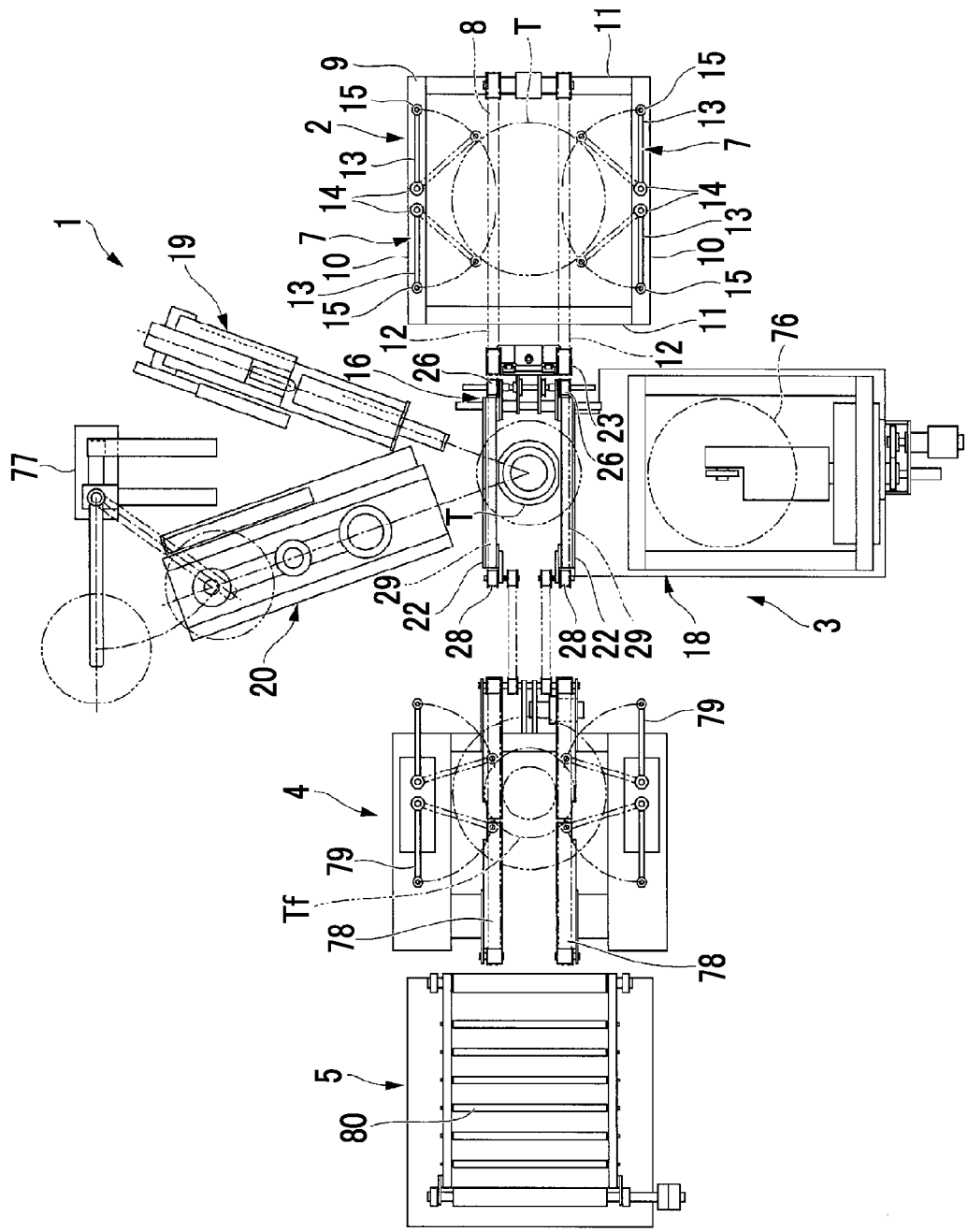
FIG. 1 is a front view showing a tire inspection system in a first embodiment of the present invention.

FIG. 1 shows a tire inspection system 1 of the first embodiment. The tire inspection system 1 of this embodiment has a function as a tire uniformity machine for measuring the non-uniformity of a tire. In addition, in the description of this embodiment, the side from which a tire which is an inspection target (hereinafter referred to simply as a "tire to be inspected T") is loaded is referred to as an "upstream side", and the side to which the tire is unloaded is referred to as a "downstream side".

The tire inspection system 1 measures a tire characteristic such as the non-uniformity of the tire to be inspected T after vulcanization molding loaded from the upstream side and unloads an inspected tire to the downstream side. The tire inspection system 1 is provided with a loading station 2, an inspection station 3, a marking station 4, and an unloading station 5 in order from the upstream side in a transport direction.

The loading station 2 performs centering of the tire to be inspected T on which a vulcanization process has been finished, and then transfers the tire to be inspected T to the inspection station 3. The loading station 2 is provided with a centering mechanism 7, a loading conveyor 8, and a frame 9. The frame 9 is provided on a floor and has a pair of transverse beams 10 and a pair of longitudinal beams 11 at an upper portion thereof. The transverse beams 10 extend in the transport direction of the tire to be inspected T. The longitudinal beams 11 extend in a horizontal direction orthogonal to the transport direction and connect end portions of the transverse beams 10 to each other. The loading conveyor 8 is mounted on the longitudinal beams 11, and the centering mechanism 7 is mounted on the transverse beams 10.

The loading conveyor 8 transports the tire to be inspected T loaded onto the loading station 2 in a horizontally placed state and transfers the tire to be inspected T to the inspection station 3. The expression "horizontally placed" refers to a state of being placed in a state where the center axis of the tire to be inspected T is directed in an up-down direction. The loading conveyor 8 is provided with a pair of belt conveyors 12 divided in the width direction. The pair of belt conveyors 12 are disposed parallel to each other. The pair of belt conveyors 12 may be made such that the distance therebetween can be adjusted according to the size of the tire to be inspected T by an adjustment mechanism (not shown).

The centering mechanism 7 is a mechanism for centering the tire to be inspected T which is transported by the loading conveyor 8. Specifically, the centering mechanism 7 adjusts the orientation of the tire to be inspected T during transport such that the center axis of the tire to be inspected T is disposed at the center between the pair of belt conveyors 12. The centering mechanism 7 is provided with four swingable arms 13.

The arms 13 are disposed one set for each of the transverse beams 10 with the two as a set. The respective sets of the arms 13 mounted on the respective transverse beams 10 are disposed to face each other so as to interpose the belt conveyors 12 therebetween from the outside in the width direction. Each of base portions 14 of the arms 13 of each set is mounted so as to be able to swing around each of pivot shafts disposed close to each other in the transport direction and extending in the up-down direction. Further, each of the arms 13 is made so as to be able to swing at a height position where an end portion 15 thereof can come into contact with a tread portion of the tire to be inspected T. Further, each of the arms 13 is made so as to be linked to a drive mechanism such as a hydraulic cylinder and be able to swing by the power of the drive mechanism.

Each of the arms 13 swings between a centering position (shown by a two-dot chain line in FIG. 1) where the arms 13 perform the centering of the tire to be inspected T and an initial position (shown by a solid line in FIG. 1) where the arms 13 do not perform the centering of the tire to be inspected T. The respective arms 13 swing by a predetermined angle corresponding to the diameter of the tire to be inspected T such that all of the end portions 15 come into contact with the tread surface of the tire to be inspected T at the centering position. On the other hand, each of the arms 13 which are at the initial position is disposed so as not to come into contact with the tire to be inspected T during transport, for example, so as to be directed in a longitudinal direction of the transverse beam 10.

The inspection station 3 has a function to measure the non-uniformity of the tire to be inspected T loaded therein through the loading station 2. The inspection station 3 is provided with a transport mechanism 16, a fastening mechanism 17 (refer to FIG. 2), a measurement unit 18, a runout measurement unit 19, and a rim stock unit 20.

The transport mechanism 16 receives the tire to be inspected T transported by the loading conveyor 8 and then transports the tire to be inspected T to a predetermined fastening position where the tire to be inspected T is fastened by the fastening mechanism 17. The transport mechanism 16 is provided with a pair of transport units 22 divided in the width direction, and a support mechanism section 23 supporting the transport units 22. In addition, the fastening position in this embodiment is set in advance in the vicinity of the center in the transport direction of the pair of transport units 22.

Figure 2:
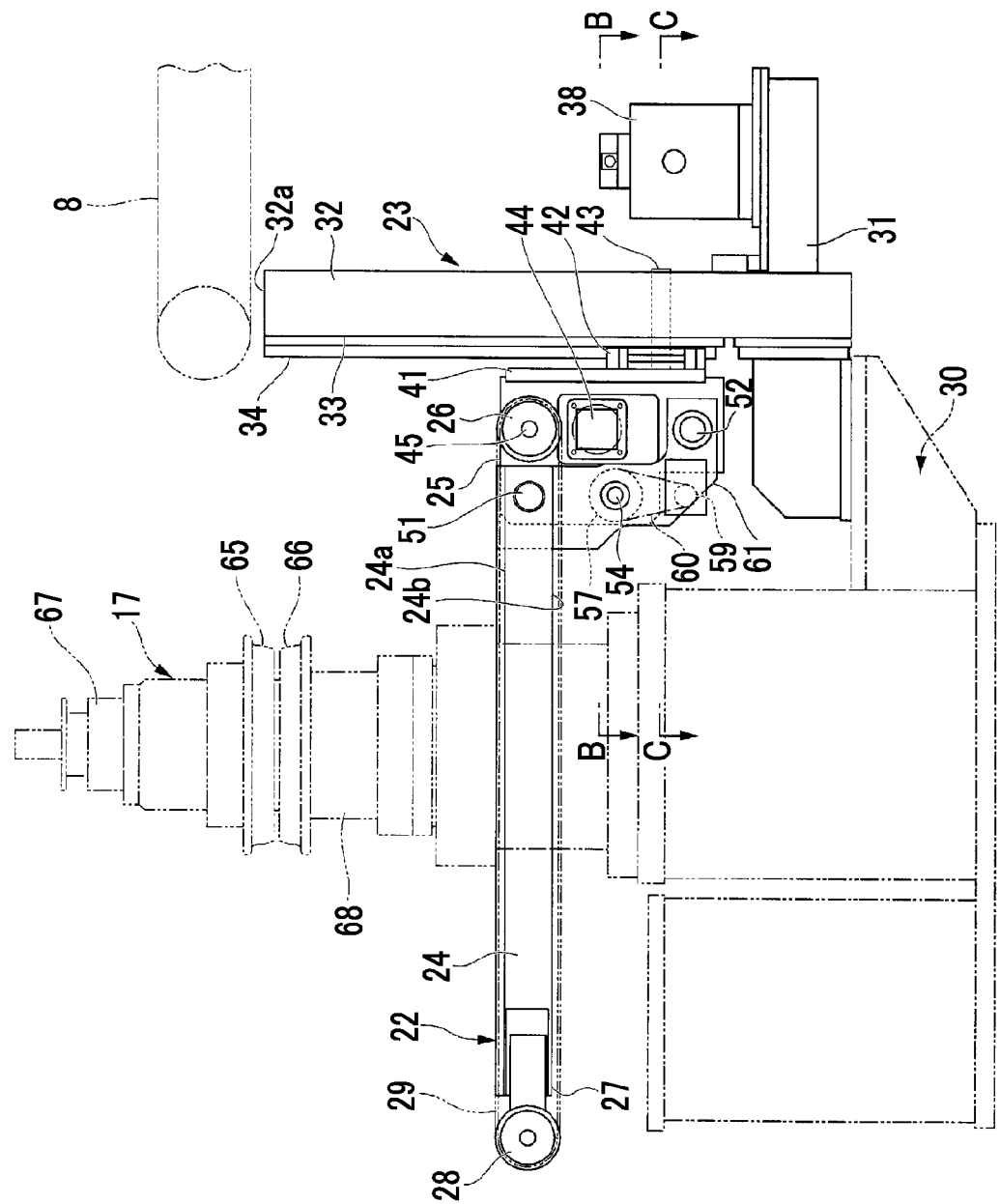
FIG. 2 is a side view of a support mechanism section in the embodiment.
Figure 3:
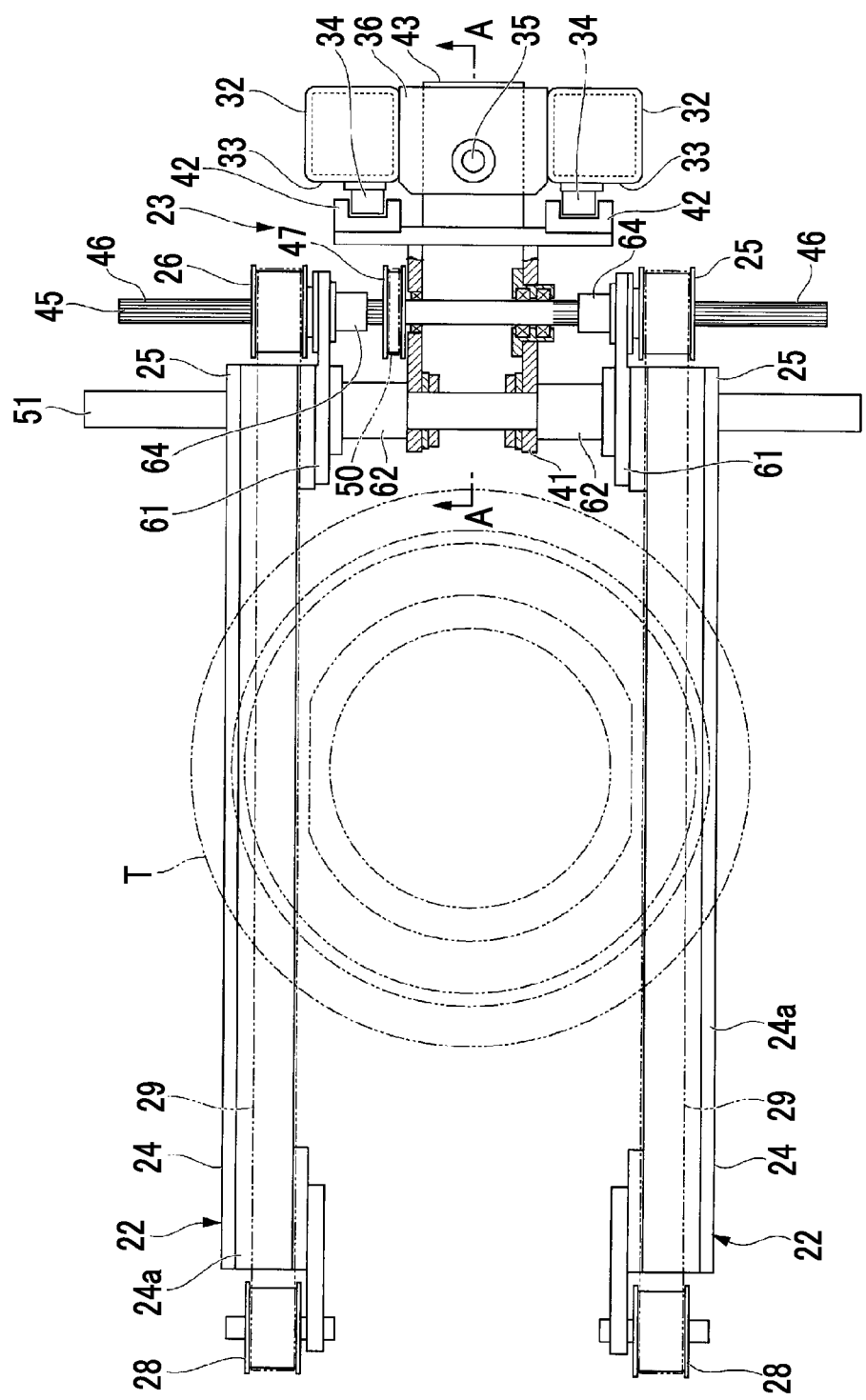
FIG. 3 is a plan view of the support mechanism section in the embodiment.

As shown in FIGS. 2 and 3, the transport unit 22 in this embodiment is configured with a belt conveyor. The transport unit 22 extends from a loading position where the transport unit 22 receives the tire to be inspected T from the loading station 2 to a transfer position where the transport unit 22 transfers the inspected tire to the marking station 4, by way of the fastening position where the tire to be inspected T is fastened by the fastening mechanism 17. The pair of transport units 22 described above is supported in a cantilever state by the support mechanism section 23 on the base portion side thereof.

Each of the transport units 22 is provided with a conveyor frame 24 which supports a load of the tire to be inspected T from below. A base portion-side pulley 26 is mounted on a base portion 25 on the upstream side of the conveyor frame 24. Further, an end portion-side pulley 28 is mounted on an end portion 27 on the downstream side of the conveyor frame 24. A belt 29 is wound around and runs between the base portion-side pulley 26 and the end portion-side pulley 28. The belt 29 moves above an upper surface 24a of the conveyor frame 24 and below a lower surface 24b of the conveyor frame 24 by the rotation of the base portion-side pulley 26 and the end portion-side pulley 28.

That is, in the transport unit 22, since the base portion-side pulley 26 is rotationally driven, whereby a portion which is disposed above the conveyor frame 24 moves in the transport direction, the tire to be inspected T placed on the belt 29 is transported in the transport direction.

The support mechanism section 23 has a function of a movement mechanism for moving the transport units 22 up and down, a function of a rotation mechanism for rotationally driving the transport units 22, and a function of a slide mechanism for making the pair of transport units 22 approach each other and be spaced apart from each other in the width direction.

As shown in FIG. 2, the support mechanism section 23 in this embodiment is provided with a base frame 31 which is supported on a lower frame 30 of the inspection station 3. A pair of guide members 32 is mounted on the base frame 31. The guide members 32 are disposed on the upstream side of the transport units 22.

Each of the pair of guide members 32 is formed in the form of a column extending in the up-down direction, and an upper end portion 32a thereof is disposed at a position slightly below the loading conveyor 8 of the loading station 2 described above.

Further, the pair of guide members 32 is disposed to be spaced apart from each other in the width direction of the transport unit 22, and rail members 34 extending in the up-down direction are mounted on downstream-side surfaces 33 thereof.

Figure 4:
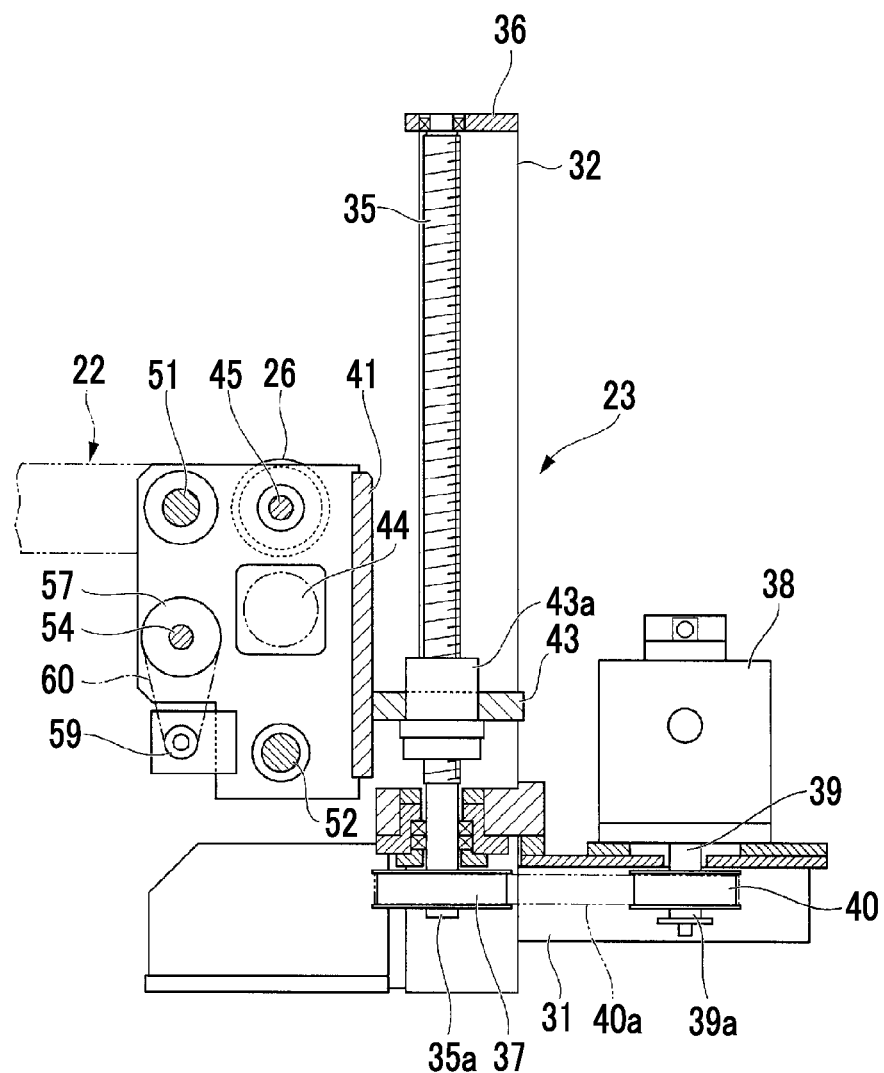
FIG. 4 is a cross-sectional view along line A-A of FIG. 3 in the embodiment.

As shown in FIG. 4, a screw shaft 35 is disposed so as to extend in the up-down direction between the pair of guide members 32. The screw shaft 35 configures a ball screw mechanism or a sliding screw mechanism which converts rotation motion into linear motion in the up-down direction. The screw shaft 35 is rotatably supported, at both end portions, by the base frame 31 and a plate 36 mounted so as to be spanned between the upper end portions 32a of the guide members 32. A screw-side pulley 37 is mounted on a lower end portion 35a of the screw shaft 35.

On the other hand, a lifting motor 38 in which a rotation direction is switchable is mounted on the base frame 31 further toward the upstream side than the screw shaft 35. The lifting motor 38 is provided with a drive shaft 39 which is directed in the up-down direction. The drive shaft 39 extends downward, and a lifting motor-side pulley 40 is mounted on a lower end portion 39a thereof.

A belt for driving 40a is wound around and runs between the lifting motor-side pulley 40 and the screw-side pulley 37 described above. The rotary power of the lifting motor-side pulley 40 is transmitted to the screw-side pulley 37 by the belt for driving 40a, and thus it becomes possible to rotate the screw shaft 35 in a direction according to the rotation direction of the lifting motor 38.

As shown in FIGS. 3 and 4, the support mechanism section 23 is provided with a main frame 41 which supports the base portions 25 of the transport units 22. Block portions 42 (refer to FIG. 3) mounted so as to be able to slide with respect to the rail members 34, and a lifting piece 43 which extends toward an area between the guide members 32 from an area between the block portions 42 are formed at the main frame 41. A nut member 43a (refer to FIG. 4) is mounted on the lifting piece 43. The nut member 43a is made so as to be able to move in the up-down direction according to the amount of rotation of the screw shaft 35. That is, the main frame 41 is made so as to be able to move in the up-down direction by rotationally driving the lifting motor 38.

Figure 5:
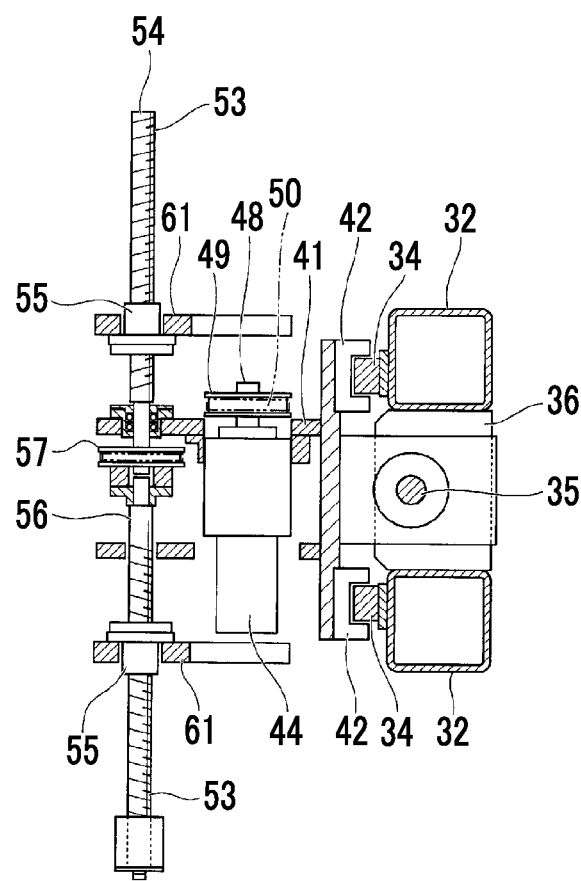
FIG. 5 is a cross-sectional view along line B-B of FIG. 2 in the embodiment.

As shown in FIGS. 2 and 5, a transport motor 44 for driving the transport units 22 is mounted on the main frame 41. Further, as shown in FIG. 3, the main frame 41 rotatably supports a spline shaft 45 extending in the width direction of the transport unit 22. Splines 46 extending in the width direction of the transport unit 22 are formed on both sides in a longitudinal direction of the spline shaft 45.

The two base portion-side pulleys 26 described above are mounted on the spline shaft 45. More specifically, the base portion-side pulleys 26 are mounted on the spline shaft 45 in a state of being unable to relatively rotate due to the splines 46 and being able to slide in the width direction of the transport unit 22. Further, a driven pulley 47 is mounted on the spline shaft 45 between the base portion-side pulleys 26.

As shown in FIG. 5, a drive shaft 48 of the transport motor 44 described above extends in the width direction of the transport unit 22. A drive pulley 49 is fixed to an end portion of the drive shaft 48. Then, a belt 50 is wound around and runs between the driven pulley 47 (refer to FIG. 3) and the drive pulley 49. That is, the spline shaft 45 is rotated by rotationally driving the transport motor 44, and the base portion-side pulleys 26 are rotated by the rotation of the spline shaft 45.

Figure 6:
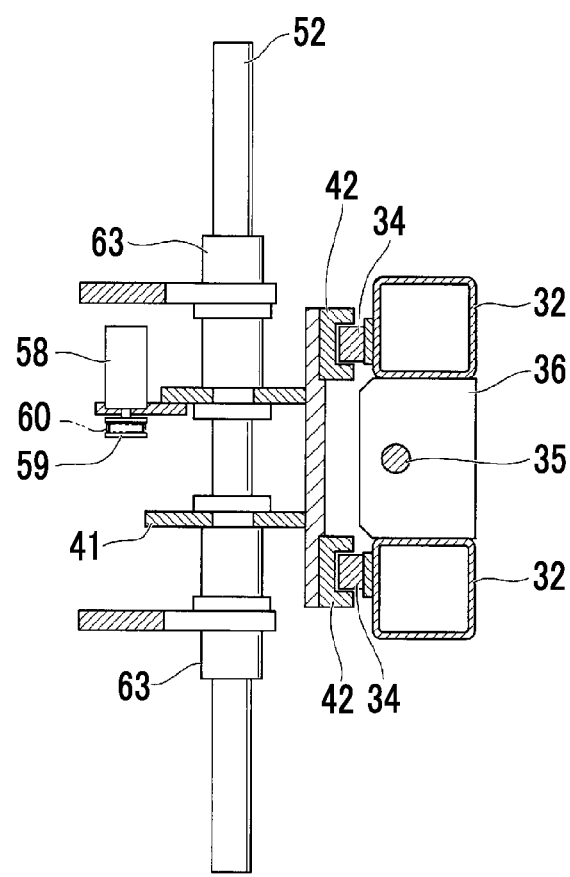
FIG. 6 is a cross-sectional view along line C-C of FIG. 2 in the embodiment.

As shown in FIGS. 2 and 3, a first slide shaft 51 is fixed, parallel to the spline shaft 45, to the main frame 41 further toward the downstream side than the spline shaft 45. The first slide shaft 51 supports the conveyor frames 24 of the transport units 22 in a state of being able to slide in the width direction. Further, as shown in FIGS. 2 and 6, a second slide shaft 52 extending parallel to the spline shaft 45 is fixed to the main frame 41 below the spline shaft 45 described above.

As shown in FIGS. 2 and 5, a screw shaft for slide having threaded portions 53 on both sides in the longitudinal direction is rotatably supported on the main frame 41 below the first slide shaft 51. The screw shaft for slide 54 configures a ball screw mechanism or a sliding screw mechanism which converts rotation motion into linear motion. The respective threaded portions 53 (refer to FIG. 5) on both sides in the longitudinal direction are made to be each other's reverse screws. Further, nuts for slide 55 which linearly move along the screw shaft for slide 54 by the rotation of the screw shaft for slide 54 are mounted on the respective threaded portions 53 of the screw shaft for slide 54. The nuts for slide 55 are disposed at symmetrical positions with respect to the center in the longitudinal direction of the screw shaft for slide 54.

A pulley for slide 57 is fixed to a central portion 56 of the screw shaft for slide 54. On the other hand, a motor for slide 58 is fixed to the main frame 41 below the screw shaft for slide 54, as shown in FIGS. 2 and 6. A belt 60 (refer to FIG. 2) is wound around and runs between a drive pulley 59 of the motor for slide 58 and the pulley for slide 57 of the screw shaft for slide 54.

Further, as shown in FIG. 5, a slide plate 61 extending in the transport direction is fixed to each of the nuts for slide 55.

As shown in FIGS. 2, 3, 5, and 6, the slide plate 61 is formed so as to be spanned between the spline shaft 45, the first slide shaft 51, the second slide shaft 52, and the screw shaft for slide 54 described above. Further, the slide plate 61 is supported so as to be able to slide with respect to the spline shaft 45, the first slide shaft 51, and the second slide shaft 52 through slide blocks 62 to 64. Here, the slide plate 61 is mounted so as to be able to relatively rotate in a circumferential direction of the spline shaft 45 in a state where a relative movement in a slide direction is restricted with respect to the slide block 64 mounted on the spline shaft 45.

That is, if the screw shaft for slide 54 is rotated in a predetermined first rotation direction by the motor for slide 58 described above, the pair of slide plates 61 moves in a direction in which the slide plates 61 approach each other. As a result, the pair of transport units 22 moves in a direction in which the transport units 22 approach each other, along with the slide plates 61.

On the other hand, if the screw shaft for slide 54 is rotated in a second rotation direction reverse to the first rotation direction by the motor for slide 58 described above, the pair of slide plates 61 moves in a direction in which the slide plates 61 are spaced apart from each other. As a result, the pair of transport units 22 moves in a direction in which the transport units 22 are spaced apart from each other, along with the slide plates 61.

As shown in FIG. 2, the fastening mechanism 17 fastens the tire to be inspected T transported to the fastening position by the transport mechanism 16 by pinching the tire to be inspected T from above and below. The fastening position is a predetermined position where the tire to be inspected T can be fastened by the fastening mechanism 17.

The fastening mechanism 17 has an upper rim 65 which is movable in the up-down direction and rotatable, and a lower rim 66 which can be rotationally driven. The upper rim 65 and the lower rim 66 are respectively made so as to be able to be disposed on both upper and lower sides of the transport units 22. The upper rim 65 is mounted on a lower end portion of an upper rim shaft 67 which can rotate around an axis. The lower rim 66 is mounted on an upper end portion of a lower rim shaft 68 which can be driven to rotate around an axis.

Further, the fastening mechanism 17 has an upper rim lifting drive unit 69 (refer to FIG. 7) which moves the upper rim shaft 67 in the up-down direction, and a lower rim rotational drive unit 70 (refer to FIG. 7) which rotationally drives the lower rim shaft 68.

Figure 10:
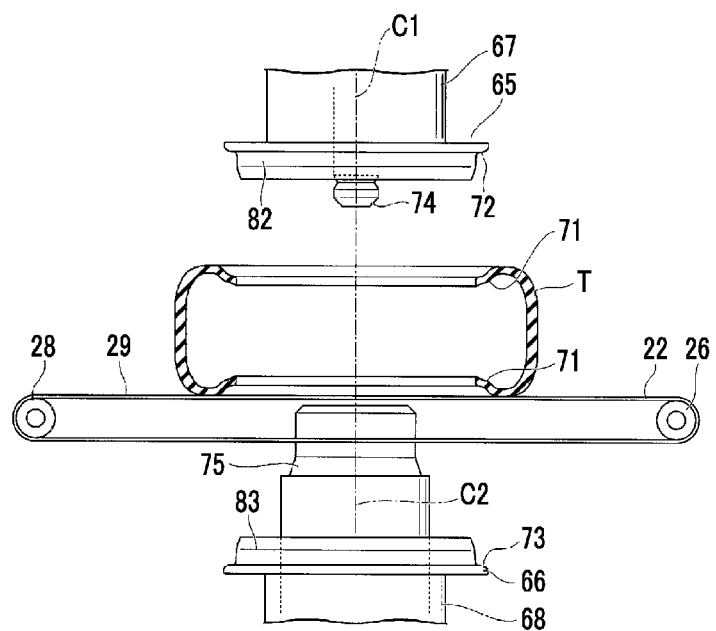
FIG. 10 is a side view showing a state where a tire is fastened by an upper rim in the embodiment.
Figure 11:
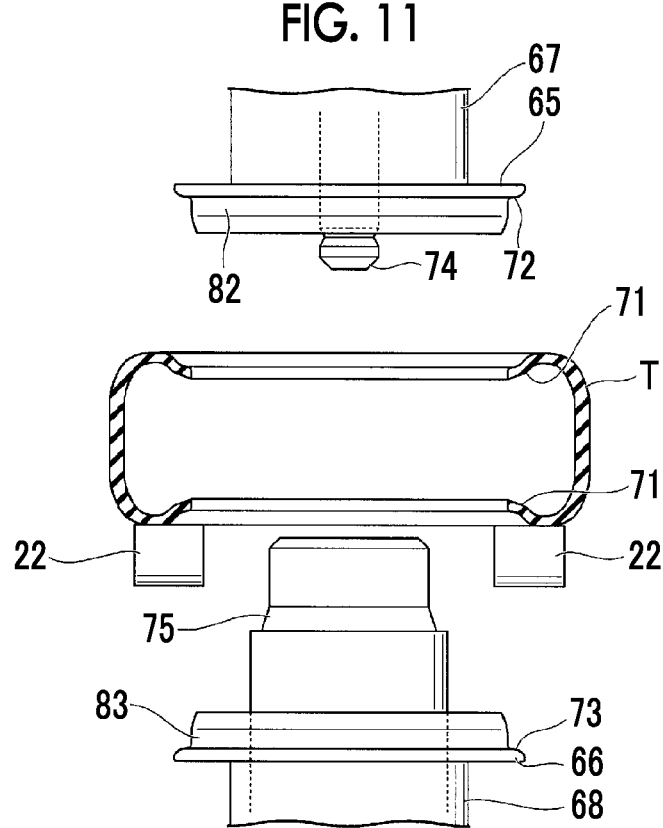
FIG. 11 is a front view showing the state where a tire is fastened by an upper rim in the embodiment.

As shown in FIGS. 2 and 10, the upper rim 65 is formed in a circular shape in a plan view having a ring-shaped profile 72 capable of coming into close contact with the entire circumference of the outer side surface of a bead portion 71 on the upper side of the tire to be inspected T.

The lower rim 66 is formed in a circular shape in a plan view having a ring-shaped profile 73 capable of coming into close contact with the entire circumference of the outer side surface of a bead portion 71 on the lower side of the tire to be inspected T. The upper rim 65 and the lower rim 66 respectively have cylindrical portions 82 and 83 which are fitted to the sides of the inner peripheries of the bead portions 71.

An axis C1 of the upper rim 65 and an axis C2 of the lower rim 66 are disposed on each other's extended lines. The upper rim 65 and the lower rim 66 are made so as to be able to be replaced by those according to the bead diameter of the tire to be inspected T. The upper rim 65 is made so as to be able to be detachably mounted on the upper rim shaft 67, and the lower rim 66 is made so as to be able to be detachably mounted on the lower rim shaft 68.

As shown in FIG. 10, an engaging protrusion 74 protruding further toward the lower side than the upper rim 65 is formed at the upper rim shaft 67. On the other hand, a tubular portion 75 protruding further toward the upper side than the lower rim 66 is formed at an upper end of the lower rim shaft 68. An engaging recess (not shown) into which the engaging protrusion 74 can be inserted is formed in an upper end portion of the tubular portion 75. A locking mechanism (not shown) is provided in the engaging recess. An engaged state of the upper rim shaft 67 and the lower rim shaft 68 is maintained by operating the locking mechanism in a state where the engaging protrusion 74 is inserted into the engaging recess, and thus a relative movement between the upper rim shaft 67 and the lower rim shaft 68 in a direction in which the upper rim shaft 67 and the lower rim shaft 68 are spaced apart from each other is restricted.

According to the fastening mechanism 17, the tire to be inspected T is pinched by the upper rim 65 and the lower rim 66 by moving the upper rim 65 down, and the movements of the upper rim shaft 67 and the lower rim shaft 68 are restricted by the locking mechanism, whereby it becomes possible to fasten the tire to be inspected T in the same hermetically-sealed state as the actual mounting state on a wheel of a vehicle.

The fastening mechanism 17 in an example of this embodiment further has a mechanism (not shown) for supplying air to the tire to be inspected T pinched by the upper rim 65 and the lower rim 66.

The lower rim rotational drive unit 70 of the fastening mechanism 17 has a rotating mechanism (not shown) such as a motor which imparts a rotational drive force for rotating the tire to be inspected T in a fastened state.

That is, a state where the upper rim shaft 67 is engaged with the lower rim shaft 68 is created, and the lower rim 66 is then rotationally driven by the lower rim rotational drive unit 70, whereby the upper rim 65 configured so as to be rotatable is driven, and thus the upper rim 65 and the lower rim 66 rotate at the same time. Thus, the tire to be inspected T pinched by the upper rim 65 and the lower rim 66 rotates. As the configuration of the rotating mechanism, a configuration is also acceptable in which a drive force is applied to both the upper rim shaft 67 and the lower rim shaft 68 and each other's rotation speeds are synchronized. Further, as another configuration of the rotating mechanism, a configuration is also acceptable in which a drive force is applied to only one of the upper rim shaft 67 and the lower rim shaft 68 and the other is driven.

The measurement unit (a measuring device) 18 measures radial run-out (RRO) indicating the non-uniformity of the dimension of the tire to be inspected T, radial force variation (RFV) indicating the variation of a force in a radial direction, lateral force variation (LFV) indicating the variation of a force in an axial direction, tangential force variation (TFV) indicating the variation of a force in a traveling direction, or the like. Here, the radial run-out (RRO) is the amount of change in which the tire to be inspected T leans in the radial direction when rotating the tire to be inspected T with air put therein. Further, the radial force variation (RFV), the lateral force variation (LFV), and the tangential force variation (TFV) are load variations in the radial direction, the axial direction, and the traveling direction of the tire to be inspected T acting on a load wheel shaft when a load is applied to the tire to be inspected T with air put therein by a load wheel 76 and the tire to be inspected T is rotated with the distance between a rotary shaft of the tire to be inspected T and the load wheel shaft kept constant.

As shown in FIG. 1, the measurement unit 18 has the load wheel 76 capable of applying a load in the radial direction to the tread portion of the tire to be inspected T fastened by the fastening mechanism 17 and being in a rotating state. The load wheel 76 is rotatable and is made so as to move to the tire to be inspected T side only when measuring a necessary measurement item and apply a predetermined load to the tire to be inspected T.

In the measurement unit 18, a sensor (not shown) for measuring a load variation acting on the load wheel 76, the amount of displacement of the upper rim shaft 67 and the lower rim shaft 68, or the like is provided. The measuring result by the sensor is calculated to an evaluation parameter of the tire to be inspected T by a computer and provided to a determination of whether or not to be within an acceptable range of each measurement value stored in advance, or the like.

The runout measurement unit 19 performs runout measurement of the tire to be inspected T which is in a rotating state.

The rim stock unit 20 is a device for stocking the upper rim 65 and the lower rim 66 prepared in advance according to the bead diameter of the tire to be inspected T. The upper rim 65 and the lower rim 66 stocked in the rim stock unit 20 are moved to the fastening position for fastening the tire to be inspected T, by a hoisting tool for set-up change 77, and replacement work is performed. In addition, the rim stock unit 20 may be appropriately provided, as necessary, and may be omitted.

Figure 7:
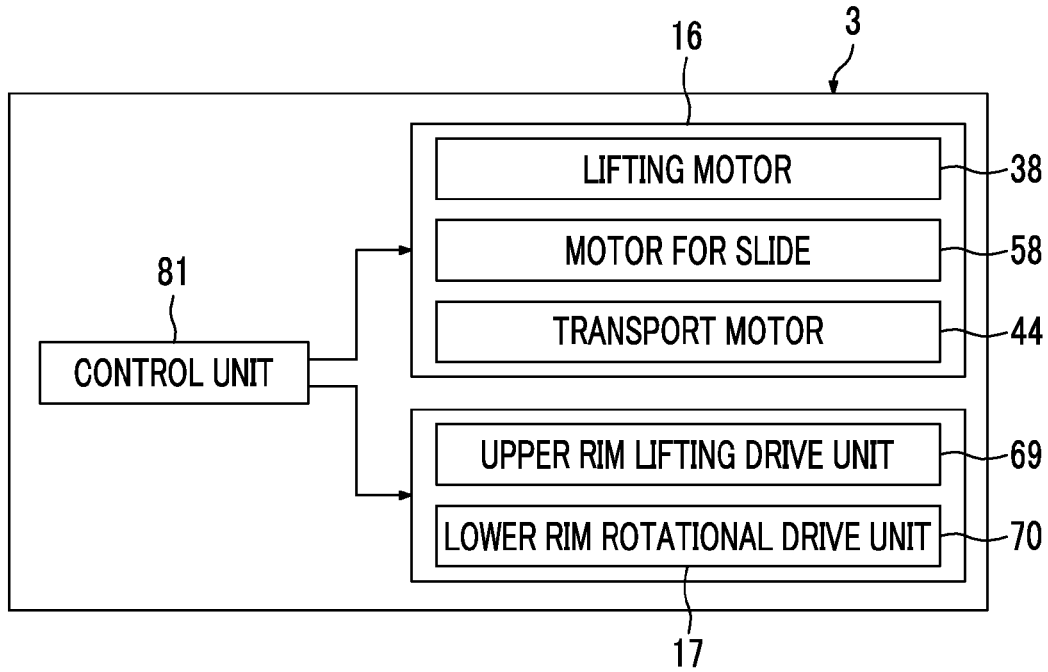
FIG. 7 is a block diagram showing a control system of an inspection station in the embodiment.

As shown in FIG. 7, the inspection station 3 is provided with a control unit 81 for performing drive control of the transport mechanism 16 described above and the fastening mechanism 17 described above. More specifically, the control unit 81 controls an operation of the transport mechanism 16 by performing drive control of the lifting motor 38, the motor for slide 58, and the transport motor 44 of the transport mechanism 16. Further, the control unit 81 controls a fastening operation and a rotation operation of the tire to be inspected T by the upper rim 65 and the lower rim 66 by controlling the upper rim lifting drive unit 69 and the lower rim rotational drive unit 70 of the fastening mechanism 17. In addition, the tire transport and fastening device according to the present invention is configured of the transport mechanism 16 and the fastening mechanism 17.

As shown in FIG. 1, the marking station 4 performs marking on an inspected tire Tf having been subjected to the measurement of non-uniformity by the inspection station 3, based on the measurement result such as the radial force variation described above. The marking station 4 is provided with a transport conveyor 78 which is similar to the loading conveyor 8 of the loading station 2 described above, and a centering mechanism 79 which is similar to the centering mechanism 7. The inspected tire Tf unloaded by the transport conveyor 78 is subjected to centering by the centering mechanism 79, and thereafter, marking is performed on a sidewall or the like of the inspected tire Tf by a marking device (not shown). Further, the marking station 4 sequentially transports the inspected tire Tf subjected to marking to the unloading station 5 by the transport conveyor 78.

The unloading station 5 is a mechanism for transferring the marked tire unloaded from the marking station 4 to a transport carriage (not shown) or the like. The unloading station 5 is provided with a roller conveyor 80 for transporting the marked tire. The marked tire is transferred to the transport carriage through the roller conveyor 80.

The tire inspection system 1 in this embodiment has the configuration described above. Next, transport and fastening control (a transport method) of the tire to be inspected T in the tire inspection system 1 described above will be described with reference to the flowchart of FIG. 8, and FIGS. 9 to 13.

Figure 8:
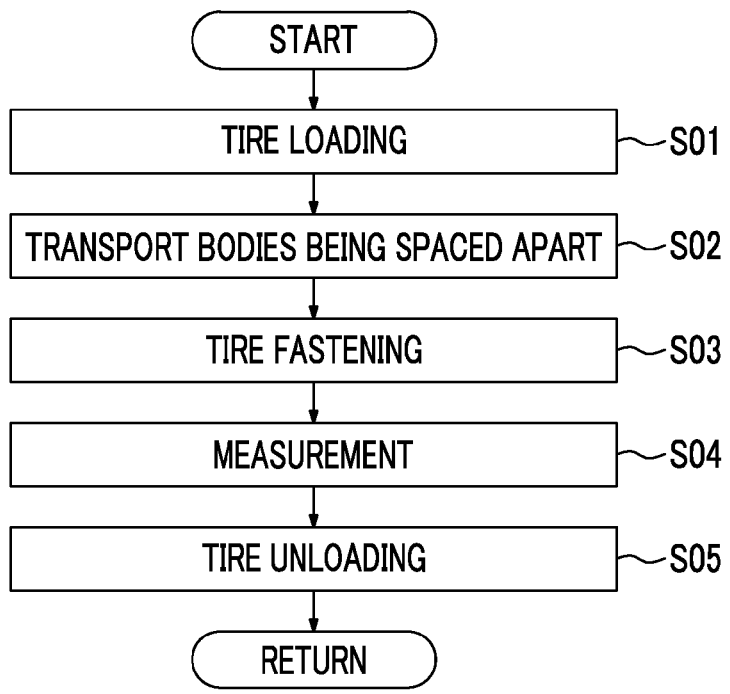
FIG. 8 is a flowchart showing an operation of a control unit in the embodiment.

As shown in FIG. 8, first, the control unit 81 makes the tire to be inspected T subjected to centering by the loading station 2 be loaded to the fastening position by the transport mechanism 16 (Step S01: transport step).

Figure 9:
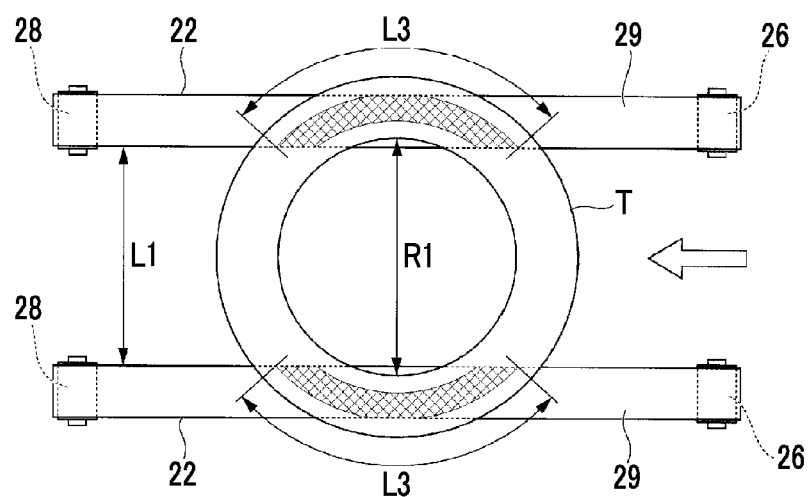
FIG. 9 is a plan view showing a state at the time of tire loading in the embodiment.

As shown in FIG. 9, the distance in the width direction between the respective transport units 22 is a predetermined distance L1 in which the orientation of the tire to be inspected T which is being transported can be stabilized. The predetermined distance L1 is set to be a distance in which a contact arc length L3, which is the length in the circumferential direction of an arcuate portion (shown by hatching in FIG. 9) where the sidewall of the tire to be inspected T comes into contact with the transport unit 22, becomes sufficiently long. The predetermined distance L1 is often set to be a distance shorter than an inner diameter R1 of the bead.

The predetermined distance L1 is a distance which is changed according to various conditions such as the width dimension of the transport unit 22, the curvature of the sidewall of the tire to be inspected T, the rigidity and the weight of the tire to be inspected T, and a frictional force between the tire to be inspected T and the transport unit 22, and can be obtained in advance by tests, simulation, or the like. In a case where the predetermined distance L1 is a distance shorter than the inner diameter R1, the distance between the transport units 22 becomes relatively narrow when the tire to be inspected T is being loaded, and thus a state where the lower rim 66 cannot pass through the space between the transport units 22 in the up-down direction is created.

Further, if the tire to be inspected T is loaded to a predetermined fastening position, the control unit 81 stops the transport of the tire to be inspected T by the transport mechanism 16. Here, the position in the transport direction of the tire to be inspected T in this embodiment is managed according to the feed rate of the belt conveyor. However, the position may be determined according to the detection of a position sensor (not shown) or the like.

Figure 13:
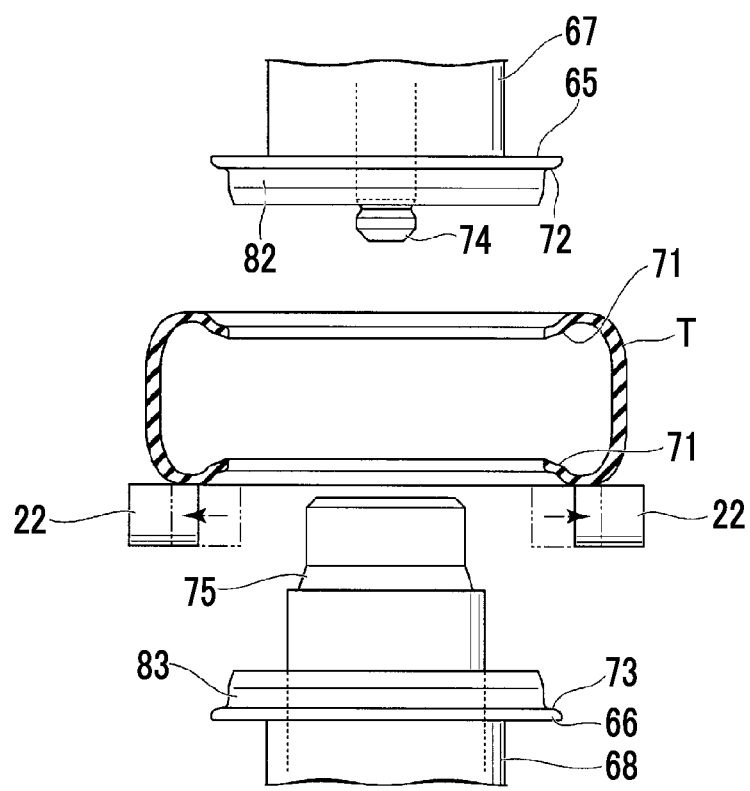
FIG. 13 is a front view showing a state where the transport units in the embodiment are spaced apart from each other in the width direction.

Subsequently, as shown in FIG. 13, the control unit 81 slides the transport unites 22, thereby making the transport units 22 be spaced apart from each other in the width direction (Step S02: spacing-apart step). More specifically, the distance between the transport units 22 is made to be a predetermined distance L2 in which the lower rim 66 can pass between the transport units 22 and the tire to be inspected T can be supported by the transport units 22 from below.

Figure 12:
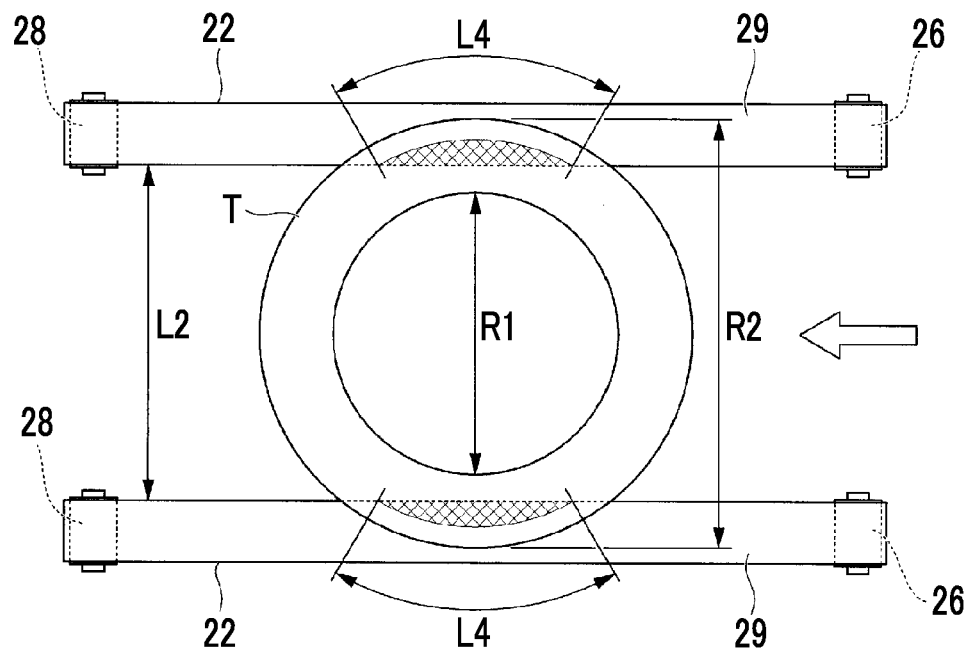
FIG. 12 is a plan view showing a state where transport units in the embodiment are spaced apart from each other in a width direction.

As shown in FIGS. 9 and 12, a contact arc length L4 in a case where the distance between the pair of transport units 22 is made to be the predetermined distance L2 becomes shorter than the contact arc length L3 in a case where the distance between the pair of transport units 22 is made to be the predetermined distance L1. The predetermined distance L2 is a distance which is longer than the inner diameter R1 of at least the bead portion 71 and shorter than an outer diameter R2 of the tire to be inspected T. The predetermined distance L2 is a distance which is changed according to various conditions of the transport unit 22 or the tire to be inspected T, similarly to the predetermined distance L1, and can be obtained in advance by tests, simulation, or the like. In FIGS. 9 and 12, the transport direction of the tire to be inspected T is shown by an arrow.

Figure 14:
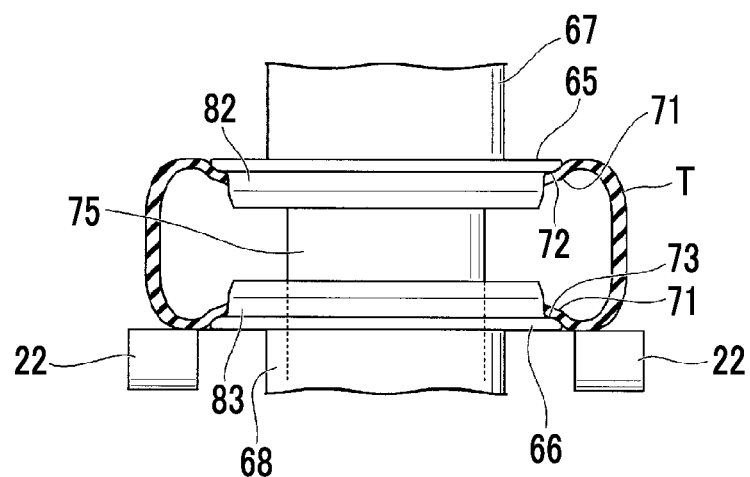
FIG. 14 is a front view showing a state where the tire is held by an upper rim and a lower rim in the embodiment.

Next, the control unit 81 moves the transport units 22 down, thereby transferring the tire to be inspected T to the lower rim 66, and at the same time, moves the upper rim 65 down, thereby pinching and fastening the tire to be inspected T by the upper rim 65 and the lower rim 66 (Step S03). As shown in FIG. 14, at this time, the cylindrical portion 83 of the lower rim 66 is fitted to the inside of the bead portion 71 on the lower side of the tire to be inspected T. Further, the cylindrical portion 82 of the upper rim 65 is fitted to the inside of the bead portion 71 on the upper side of the tire to be inspected T.

Figure 15:
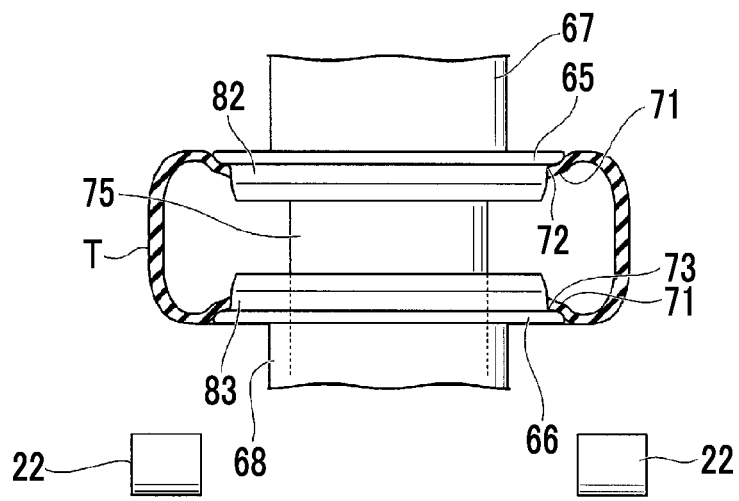
FIG. 15 is a front view showing a state where the transport units in the embodiment are spaced apart from the tire after the tire is held.

Thereafter, as shown in FIG. 15, the control unit 81 moves the transport units 22 down, thereby making the transport units 22 be spaced apart downward from the tire to be inspected T.

Subsequently, the control unit 81 performs each measurement while rotating the tire to be inspected T (Step S04).

Further, if the measurement is completed, the control unit 81 unloads the inspected tire Tf toward the marking station 4 on the downstream side of the inspection station 3 by the transport units 22 (Step S05).

At this time, the control unit 81 moves the upper rim 65 and the transport units 22 up in the order to the upper rim 65 and the transport units 22 or moves the upper rim 65 and the transport units 22 up at the same time. In this way, it is possible to make the inspected tire Tf be spaced apart from the lower rim 66 in a state where the sidewall on the lower side of the inspected tire Tf is supported by the transport units 22. Thereafter, the transport units 22 are driven, thereby transporting the inspected tire Tf to the downstream side in the transport direction and transferring the inspected tire Tf to the marking station 4.

Here, in this embodiment, the inspected tire Tf is unloaded in a state where the distance between the transport units 22 is the predetermined distance L2. However, the inspected tire Tf may be unloaded with the distance between the transport units 22 returned to the predetermined distance L1. In this case, it is favorable if the distance between the transport units 22 is returned to the predetermined distance L1 in a state where the lower rim 66 is made to be spaced apart from the inspected tire Tf and the inspected tire Tf is then pinched by the upper rim 65 and the transport units 22.

Therefore, according to the tire inspection system 1 of the first embodiment described above, if the tire to be inspected T is transported to the fastening position by the transport mechanism 16, it is possible to make the pair of transport units 22 be spaced apart from each other such that the pair of transport units 22 relatively moves downward with respect to the lower rim 66, whereby the tire to be inspected T can come into contact with the lower rim 66. For this reason, when loading the tire to be inspected T from the upstream side, it is possible to shorten the distance between the transport units 22. As a result, it is possible to prevent the orientation of the tire to be inspected T from becoming unstable during transport, and therefore, it is possible to transport the tire to be inspected T to a correct fastening position and properly fasten the tire to be inspected T by the upper rim 65 and the lower rim 66.

In addition, it is possible to prevent the orientation of the tire to be inspected T from being disturbed during transport, and therefore, it is possible to expedite the inspection.

Next, a tire transport and fastening device and a tire inspection system according to a second embodiment of the present invention will be described. The second embodiment uses the same device as that in the first embodiment described above and is different from the first embodiment only in that a holding step of holding the tire to be inspected T is added. For this reason, FIGS. 9, 12, and 15 of the first embodiment are incorporated herein and description is made with the same portions denoted by the same reference numerals.

The tire transport and fastening device and the tire inspection system of the second embodiment are different from the tire transport and fastening device and the tire inspection system of the above-described first embodiment in terms of only control processing which is executed by the control unit 81, and have the same machine configuration.

Hereinafter, transport and fastening control (a transport method) of the tire to be inspected T in the tire inspection system of the second embodiment will be described with reference to the flow chart of FIG. 16, and FIGS. 9, 12, 15, and 17 to 19.

Figure 16:
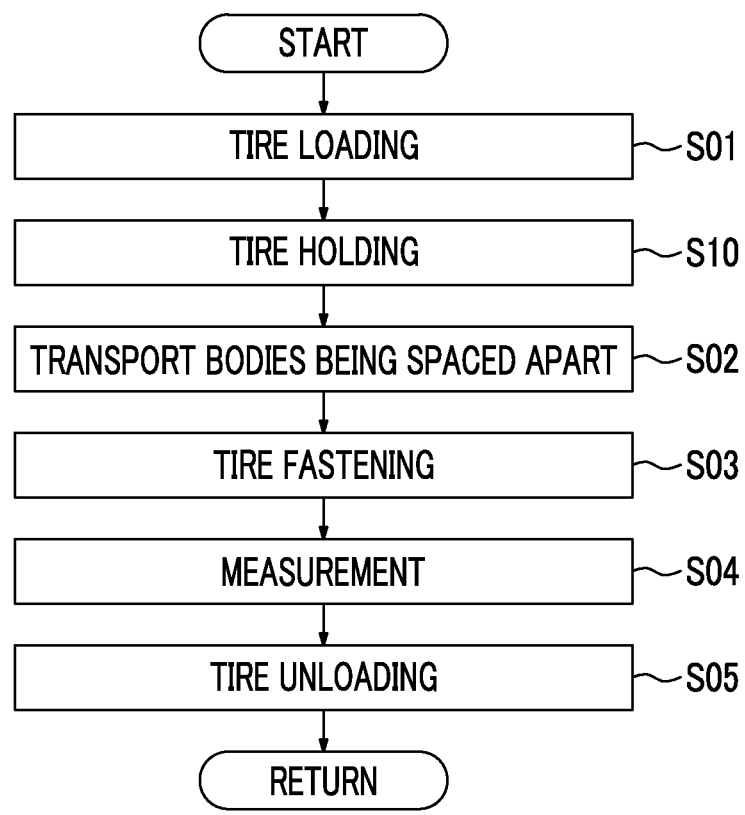
FIG. 16 is a flowchart equivalent to FIG. 8 in a second embodiment of the present invention.

As shown in FIG. 16, first, the control unit 81 makes the tire to be inspected T subjected to centering by the loading station 2 be loaded to the fastening position by the transport mechanism 16 (Step S01: transport step), similarly to the first embodiment. At this time, as shown in FIG. 9, the distance in the width direction between the transport units 22 is the predetermined distance L1.

Subsequently, the control unit 81 makes the tire to be inspected T loaded to the fastening position be held by using the fastening mechanism 17 (Step S10: holding step).

Figure 17:
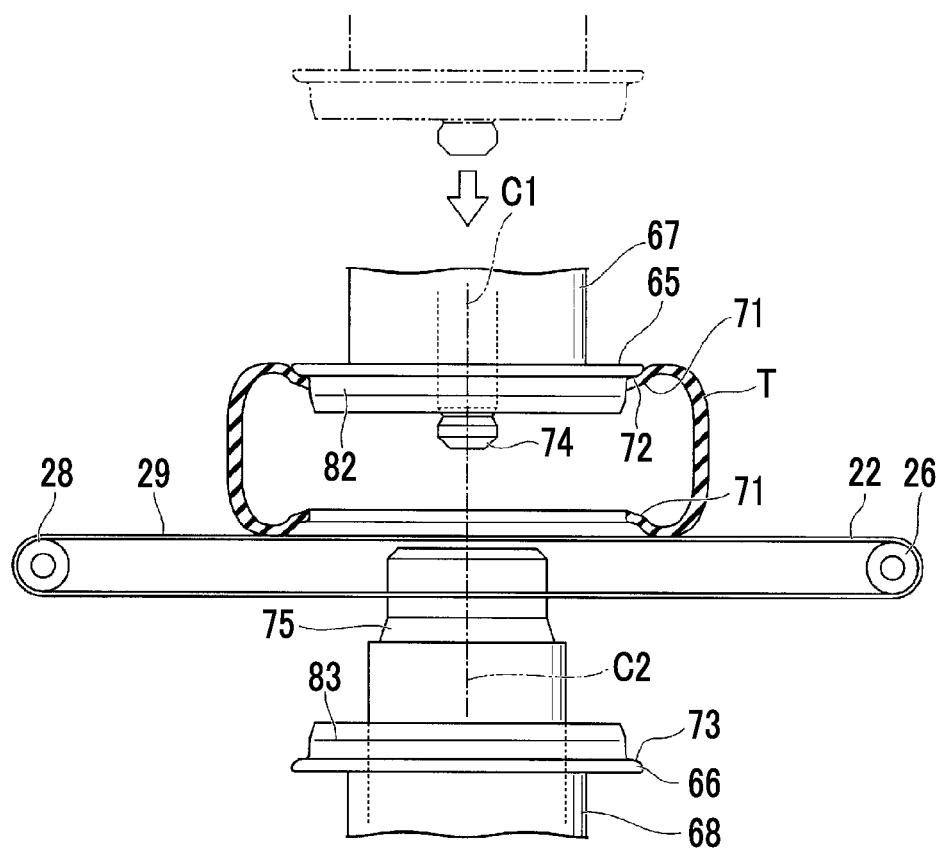
FIG. 17 is a side view equivalent to FIG. 10 in the second embodiment.
Figure 18:
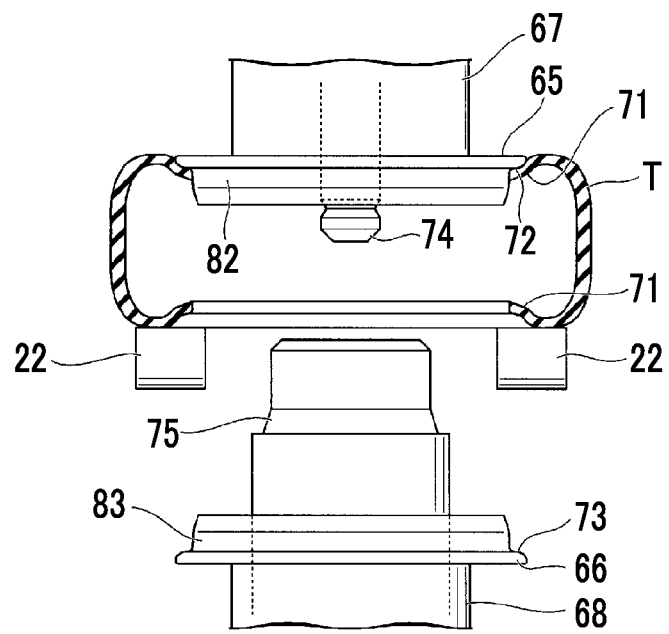
FIG. 18 is a front view equivalent to FIG. 11 in the second embodiment.

Here, as shown in FIGS. 17 and 18, the control unit 81 moves the upper rim 65 down, thereby making the cylindrical portion 82 of the upper rim 65 be fitted to the inside of the bead portion 71 on the upper side of the tire to be inspected T. In this way, a holding state where the movement to the upper side in the axial direction and the movement in the radial direction of the tire to be inspected T are restricted is created. That is, in this embodiment, the upper rim 65 described above functions as a holding mechanism for holding the tire to be inspected T.

Figure 19:
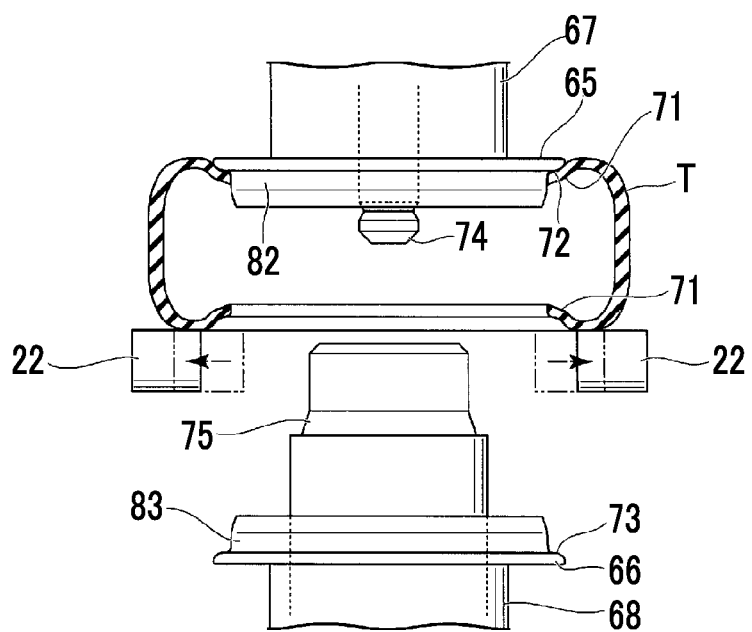
FIG. 19 is a front view equivalent to FIG. 13 in the second embodiment.

Thereafter, the control unit 81 slides the transport units 22, as shown in FIG. 19, thereby making the transport units 22 be spaced apart from each other in the width direction (Step S02: spacing-apart step). That is, in the second embodiment, the transport units 22 are spaced apart from each other in a state where the tire to be inspected T is held. As shown in FIG. 12, by the spacing-apart step, the distance between the transport units 22 becomes the predetermined distance L2 in which it is possible to make the lower rim 66 described above pass therein.

Thereafter, similarly to the first embodiment described above, the transport units 22 are moved down, thereby making the tire to be inspected T be transferred to the lower rim 66, and at the same time, the upper rim 65 is moved down, thereby pinching and fastening the tire to be inspected T by the upper rim 65 and the lower rim 66 (Step S03). Further, as shown in FIG. 15, the control unit 81 moves the transport units 22 down, thereby making the transport units 22 be spaced apart downward from the tire to be inspected T.

Further, the control unit 81 performs each measurement while rotating the tire to be inspected T (Step S04). Further, if the measurement is completed, the inspected tire Tf is unloaded toward the marking station 4 on the downstream side of the inspection station 3 by the transport units 22 (Step S05).

When unloading the inspected tire Tf toward the marking station 4, the distance between the transport units 22 may be set to be any distance of the predetermined distance L1 and the predetermined distance L2. For example, in a case where the distance between the transport units 22 is returned from the predetermined distance L2 to the predetermined distance L1 at the time of transport, the transport units 22 may be slid in a state where the inspected tire Tf is held by the upper rim described above. More specifically, first, the upper rim 65 and the transport units 22 are simultaneously moved up from a state where the inspected tire Tf is fastened by the upper rim 65 and the lower rim 66. In this way, the lower rim 66 is relatively spaced apart downward from the inspected tire Tf. Subsequently, the transport units 22 are slid, thereby making the distance between the transport units 22 the predetermined distance L1.

Therefore, according to the tire inspection system of the second embodiment described above, after the tire to be inspected T is held by the upper rim 65 at the fastening position, the pair of transport units 22 is slid in a direction in which the transport units are spaced apart from each other. For this reason, it is possible to prevent the orientation of the tire to be inspected T from being disturbed due to the tire to be inspected T being dragged to one of the pair of transport units 22 at the time of the slide of the transport units 22.

Further, when the tire to be inspected T is transported to the fastening position and the pair of transport units 22 is slid in a direction in which the transport units are spaced apart from each other, it is possible to hold the tire to be inspected T by effectively using the upper rim 65 provided in order to fasten the tire to be inspected T. For this reason, it is possible to reduce the number of components, as compared to a case where a dedicated device for holding the tire to be inspected T is provided.

In addition, the present invention is not limited to each of the above-described embodiments and includes examples in which various changes are applied to each of the above-described embodiments within a scope which does not depart from the gist of the present invention. That is, the specific shape, configuration, or the like mentioned in each embodiment is only an example and a change can be appropriately made thereto.

For example, in each of the above-described embodiments, a case where the tire inspection system 1 has a function of a tire uniformity machine has been described as an example. However, there is no limitation thereto, and it is acceptable if it is a tire inspection system which is provided with a tire transport and fastening device for fastening the tire to be inspected T. For example, the present invention can also be applied to a tire inspection system having a function of a dynamic balancing machine.

Further, in each of the above-described embodiments, the tire inspection system 1 provided with the measuring device for measuring the characteristics of the tire to be inspected T has been described as an example. However, the tire transport and fastening device according to the present invention can also be applied to an apparatus such as a post cure inflator (PCI) apparatus in which an inspection is not performed after a tire is transported.

Further, in each of the above-described embodiments, a case of using a belt conveyor as the transport unit 22 has been described. However, there is no limitation to the belt conveyor. It is acceptable if it is a mechanism capable of transporting the tire to be inspected T to the fastening position and is a mechanism capable of being disposed to be spaced apart in the width direction, and for example, a roller conveyor or the like may also be used.

In addition, in the first embodiment described above, a configuration may be made such that when unloading the inspected tire Tf in a fastened state, the moving-up of the upper rim 65 is synchronized with the moving-up of the transport units 22 and the distance between the transport units 22 is returned to the predetermined distance L1 with the upper rim 65 fitted into the inspected tire Tf.

Further, in the second embodiment described above, a case of using the upper rim 65 as a holding mechanism has been described. However, there is no limitation thereto. For example, a dedicated device for fastening the tire to be inspected T may be provided separately from the upper rim 65. As the dedicated device for fastening the tire to be inspected T, for example, a device having a mechanism which is similar to the centering mechanism 7 of the loading station 2 described above can be used. That is, a mechanism in which the tread portion of the tire to be inspected T transported is pinched by end portions of four arms from the outside in the width direction of the pair of the transport units 22 may be used as the holding mechanism.

Further, in the second embodiment described above, a case where the upper rim 65 is moved down when holding the tire to be inspected T by the upper rim 65 has been described as an example. However, in addition to moving the upper rim 65 down, for example, a configuration may be made such that the transport units 22 are moved up, thereby making the upper rim 65 be fitted into the tire to be inspected T and thus holding the tire to be inspected T.

Further, in each of the above-described embodiments, a case where the lower rim 66 is in a state of being fixed in the up-down direction without moving up and down and the transport units 22 and the upper rim 65 move up and down, whereby the transport units 22 and the upper rim 65 relatively move with respect to the lower rim 66 in the up-down direction, has been described as an example. However, a configuration may be made such that the upper rim 65 is in a state of being fixed in the up-down direction without moving up and down and the transport units 22 and the lower rim 66 move up and down, whereby the transport units 22 and the lower rim 66 relatively move up and down with respect to the upper rim 65. In addition, a configuration may be made such that the transport units 22 are in a state of being fixed in the up-down direction and the upper rim 65 and the lower rim 66 move up and down, whereby the upper rim and the lower rim relatively move with respect to the transport units 22. Further, a configuration may be made such that all of the upper rim 65, the lower rim 66, and the transport units 22 move up and down and relatively move.

INDUSTRIAL APPLICABILITY

The present invention can be widely applied to a tire transport method of transporting a tire, a tire transport and fastening device for fastening a tire transported by a loading conveyor, and a tire inspection system.

REFERENCE SIGNS LIST

1: tire inspection system
2: loading station
3: inspection station
4: marking station
5: unloading station
7: centering mechanism
8: loading conveyor
9: frame
10: transverse beam
11: longitudinal beam
12: belt conveyor
13: arm
14: base portion
15: end portion
16: transport mechanism
17: fastening mechanism
18: measurement unit
19: runout measurement unit
20: rim stock unit
22: transport unit
23: support mechanism section
24: conveyor frame
25: base portion
26: base portion-side pulley
27: end portion
28: end portion-side pulley
29: belt
30: lower frame
31: base frame
32: guide member
32a: upper end portion
33: downstream-side surface
34: rail member
35: screw shaft
35a: lower end portion
36: plate
37: screw-side pulley
38: lifting motor
39: drive shaft
39a: lower end portion
40: lifting motor-side pulley
40a: belt
41: main frame
42: block portion
43: lifting piece
43a: nut member
44: transport motor
45: spline shaft
46: spline
47: driven pulley
48: drive shaft
49: drive pulley
50: belt
51: first slide shaft
52: second slide shaft
53: threaded portion
54: screw shaft for slide
55: nut for slide
56: central portion
57: pulley for slide
58: motor for slide
59: drive pulley
60: belt
61: slide plate
62: slide block
63: slide block
64: slide block
65: upper rim
66: lower rim
67: upper rim shaft

68: lower rim shaft
69: upper rim lifting drive unit
70: lower rim rotational drive unit
71: bead portion
72: profile
73: profile
74: engaging protrusion
75: tubular portion
76: load wheel
77: hoisting tool for set-up change
78: transport conveyor
79: centering mechanism
80: roller conveyor
81: control unit
82: cylindrical portion
83: cylindrical portion
T: tire to be inspected
Tf: inspected tire

The invention claimed is:

1. A tire transport method in a tire inspection system for performing measurement with a tire transported from an upstream side fastened by an upper rim and a lower rim, the method comprising:
   a transport step of transporting the tire to a fastening position for fastening the tire by a transport mechanism having a pair of transport units divided in a width direction, while a distance between the pair of transport units is dimensioned such that the lower rim cannot pass into a space between the pair of transport units in a vertical direction; and
   a spacing-apart step of making the pair of transport units be spaced apart from each other in the width direction such that the lower rim can pass between the pair of transport units, if the tire is transported to the fastening position by the pair of transport units.

2. The transport method according to claim 1, further comprising:
   a holding step of holding the tire disposed on the pair of transport units at the fastening position,
   wherein the spacing-apart step is performed in a state where the tire is held in the holding step.

3. The transport method according to claim 2, wherein in the holding step, the tire disposed on the pair of transport units is held by the upper rim.

4. A tire inspection system comprising:
   a measuring device for measuring characteristics of the tire transported by the tire transport method according to claim 1.

5. A tire transport and fastening device for transporting a tire to a fastening position set in advance and pinching and fastening the tire by an upper rim and a lower rim at the fastening position, the device comprising:
   a pair of transport units divided in a width direction, for transporting the tire;
   a slide mechanism for making the pair of transport units approach each other and be spaced apart from each other in the width direction; and
   a control unit for controlling approach and spacing-apart of the pair of transport units by the slide mechanism,
   wherein the control unit makes the pair of transport units be spaced apart from each other by the slide mechanism such that the lower rim can pass between the pair of transport units, if the tire is transported to the fastening position by the pair of transport units, while a distance between the pair of transport units is dimensioned such that the lower rim cannot pass into a space between the pair of transport units in a vertical direction when the tire is transported to the fastening position.

6. The tire transport and fastening device according to claim 5, further comprising:
   a holding mechanism for holding the tire transported to the fastening position, thereby restricting movement of the tire, when the pair of transport units is spaced apart from each other by the slide mechanism.

7. The tire transport and fastening device according to claim 6, wherein the holding mechanism holds the tire by the upper rim.

8. A tire inspection system comprising: the transport and fastening device according to claim 5; and
   a measuring device for measuring characteristics of the tire fastened by the upper rim and the lower rim.

* * * * *